US012446584B2

(12) United States Patent
Nouvel et al.

(10) Patent No.: US 12,446,584 B2
(45) Date of Patent: Oct. 21, 2025

(54) TERMITICIDE COMPOSITION AND METHODS FOR TREATING TERMITES

(71) Applicant: ADAMA MAKHTESHIM LTD., Beer Sheva (IL)

(72) Inventors: Larry Mearns Nouvel, Plano, TX (US); Mark Allen Boyd, Seabrook, TX (US)

(73) Assignee: ADAMA MAKHTESHIM LTD., Beer Sheva (IL)

( * ) Notice: Subject to any disclaimer, the term of this patent is extended or adjusted under 35 U.S.C. 154(b) by 0 days.

(21) Appl. No.: 17/716,082

(22) Filed: Apr. 8, 2022

(65) Prior Publication Data

US 2022/0304306 A1 Sep. 29, 2022

Related U.S. Application Data

(63) Continuation of application No. 14/774,341, filed as application No. PCT/US2014/025635 on Mar. 13, 2014, now abandoned.

(60) Provisional application No. 61/788,396, filed on Mar. 15, 2013.

(51) Int. Cl.
  *A01N 51/00* (2006.01)
  *A01N 25/02* (2006.01)
  *A01N 47/02* (2006.01)

(52) U.S. Cl.
  CPC ............. *A01N 51/00* (2013.01); *A01N 25/02* (2013.01); *A01N 47/02* (2013.01)

(58) Field of Classification Search
  CPC .......... A01N 51/00; A01N 25/02; A01N 47/02
  See application file for complete search history.

(56) References Cited

U.S. PATENT DOCUMENTS

| | | | |
|---|---|---|---|
| 6,077,860 A * | 6/2000 | Meunier | A01N 51/00 514/404 |
| 2002/0119556 A1* | 8/2002 | Husseneder | A01N 63/50 424/93.2 |
| 2007/0253992 A1* | 11/2007 | Kubota | A01N 25/006 424/410 |
| 2009/0215760 A1* | 8/2009 | Hungenberg | A01N 43/56 514/357 |

OTHER PUBLICATIONS

Cheng et. al. (Chin. J. Hyg. Insec. and Equip (2011) 17) . (Year: 2011).*
Luo (Thesis, Aug. 2010). (Year: 2010).*

* cited by examiner

*Primary Examiner* — Marcos L Sznaidman
(74) *Attorney, Agent, or Firm* — Gary J. Gershik

(57) ABSTRACT

A termiticide concentrate comprising a termiticide composition comprising a phenylpyrazole, such as tipronil and a neonicotinoid, such as imidacloprid, wherein the composition is dispersed in an aqueous medium to form the termiticide concentrate. The concentrate containing the combination of active termiticides provides an increased efficacy not exhibited by either active when used alone.

14 Claims, No Drawings

TERMITICIDE COMPOSITION AND METHODS FOR TREATING TERMITES

CROSS-REFERENCE TO RELATED APPLICATIONS

This application is a continuation of U.S. Ser. No. 14/774,341, filed Sep. 10, 2015, which is a § 371 national stage of PCT International Application No. PCT/US2014/25635, filed Mar. 13, 2014, and claims the benefit of U. S. Provisional Application No. 61/788,396, filed Mar. 15, 2013, the entire content of which is hereby incorporated by reference herein.

TECHNICAL FIELD

The present subject matter relates to a termiticide composition comprising active termiticides comprising a phenylpyrazole selected from the group consisting of acetoprole, ethiprole, fipronil, pyraclofos, pyrafluprole, pyriprole, vaniliprole, and combinations thereof; and, a neonicotinoid selected from the group consisting of imidacloprid, acetamiprid, nithiazine, thiamethoxam, dinotefuran, nitenpyram, thiacloprid, clothianadin, and combinations thereof, which composition results in increased efficacy against termites compared to either active termiticide applied alone.

The present subject matter also relates to a method for controlling termites by applying a termiticide concentrate comprising the termiticide composition dispersed in an aqueous medium to an area where termite control is needed.

BACKGROUND

Termites are undisputedly the most destructive of all structural insects. Termites are estimated to cause 1.5 billion dollars of damage to structures annually, and an additional one billion dollars is spent on treatment. Depending on the type of termite, a colony can cover as much as 22,000 square feet. These industrious insects work 24 hours a day, gradually eating wood and any other cellulose containing material in their environment. Since they remain hidden within the wood in which they are feeding, in mud tubes, or in the soil, they typically wreak havoc undetected. There are two types of termites, described as i) dry wood termites, and ii) subterranean termites. Of these two types, the subterranean termites usually live in the soil (i.e., soil-born), from which they build mud tubes to structural wood where they then feed.

Control of subterranean termites can be accomplished by strategic application of a termiticide concentrate to the soil where there is a termite infestation, to provide a continuous chemical barrier in soil surrounding and beneath a structure. However, the final distribution of a termiticide concentrate in soil is the result of a series of variables: soil moisture, soil type, solubility of the active ingredient in water, microbial degradation, composition type, and application variables such as volume applied, pressure and nozzle type. The preferred method for control of soil-borne termites is by the application of a termiticide concentrate directly to the surface of soil, thereby creating a chemical barrier in the soil when the active termiticide leaches into the soil. Termiticides having potential utility in application directly to the surface of soil are applied in the form of a termiticide concentrate. A "termiticide concentrate" is defined herein as a termiticide composition comprising at least one active termiticide wherein the composition is dispersed in an aqueous medium to form a termiticide concentrate prior to its application to a locus where termite control is needed. Termiticide concentrates are popular materials used for subterranean termite control. There are two general types of termiticide concentrates used to treat termites around buildings (such as homes): repellent and non-repellent.

Repellant termiticide concentrates do not attract termites, but instead make a treated area unappealing to termites. Termites coming into contact with repellents are directed away from the structure. A repellent barrier treatment required a thorough soil application to treat as many termite entry points as was practically possible. For many structures, this treatment required extensive drilling through slabs and foundation walls in order to reach and treat vulnerable areas in the soil where termites may enter. The problem with this type of treatment is that some termite entry points may be difficult to find and even the smallest gap in the barrier, until closed, could allow termites to enter and have the chance to damage a structure. Repellent termiticides are designed to control only those termites that come into direct contact with the product.

Non-repellant products typically are not easily detected by termites, so the insects do not attempt to avoid the treated area. Instead, they continue to tunnel, into the treatment zone, unaware that they are coming into contact with treated soil. Forager termites normally are the first to physically contact and act as a carrier for these non-repellent products, which are then shared with the rest of the colony during feeding and grooming, effectively controlling the colony's members. The result of this transfer effect is control of more termites than just those that enter a treatment zone. Also, gaps in treatment application are less of a problem with non-repellent termiticides compared to repellent termiticides. Non-repellent termiticide concentrates and extensive field research have brought new treatment options to the market. Non-repellent products can be applied using conventional perimeter treatments.

Both phenylpyrazoles (e.g., fipronil) and neonicotinoids (e.g., imidacloprid) are two of the most common types of non-repellant termiticides in the termite control market today. Phenylpyrazoles achieve their efficacy by disrupting the central nervous system by blocking the passage of chloride ions through the GABA receptor and glutamate-gated chloride channels (GluCl), components of the central nervous system. This disruption causes hyperexcitation of contaminated nerves and muscles, which results in eventual death. Neonicotinoids achieve their efficacy by binding to the postsynaptic nicotinic acetylcholine receptors (nAChR). Both types of compounds are slow-acting termiticides and, as such, can be carried back to nests. Neonicotinoids have been found to provide good soil mobility for providing a continuous chemical barrier. Ballard et al., U.S. Pat. No. 8,133,499, at column 2, lines 2-4.

Fipronil was first introduced to the United States in 1996 by Rhone Poulenc Ag. Company. The first fipronil product in termite control in the United States was Termidor®, which was approved by the EPA in 1999. Compared to fipronil, imidacloprid has a longer history, with its first synthesis and mode of action being reported in 1984. Premise® is the first trademark of the imidacloprid product for termite control in the United States marketed by Bayer Corporation in the mid-1990s. Both are popular, individually, for their non-repellant and efficacious nature. Non-repellency, delayed toxicity and horizontal transfer have been shown to lead to higher control efficacy for termite populations than do traditional repellant pyrethroids or acutely toxic organophosphorous termiticides. See Kard, B. (2001). *Gulfport studies stay the course*. Pest Control 69:

30-33, 73; Hu, X. P. (2005). *Evaluation of efficacy and nonrepellance of indoxacarb and fipronil-treated soil at various concentrations and thicknesses against two subterranean termites (Isoptera: Rhinotermitidae)*. Journal of Economic Entomology 98: 509-517 (2005); and Tsunoda, K. (2006). *Effect of 18-months' storage of treated sandy loam on the transfer of fipronil from exposed workers to unexposed workers of Coptotermes formosanus (Isoptera: Rhinotermitidae)*. Sociobiology 48: 627-634 (2006). As discussed further below, imidacloprid has also demonstrated some effects on termites typically consistent with repellant termiticides.

Ballard, U.S. Pat. No. 8,133,499, reports termiticide compositions including a synergistic mix of a neonicotinoid, such as imidacloprid, and a pyrethoid, such as bifenthrin. And Karr, U.S. Pat. No. 6,093,415 reports termiticide compositions using a synergistic mix of a chitin synthesis inhibitor and a juvenile hormone mimic.

At one time, it was theorized that there might be a synergistic effect when phenylpyrazole and neonicotinioid agents were combined, since they each have different modes of action. However, at least one study has concluded that imidacloprid reduces the effectiveness of fipronil when the two termiticides are combined together. See Luo, P., *Toxicity Interaction of Fipronil and Imidacloprid against Coptotermes formosanus* (Thesis Dissertation, 2010). The first objective of Luo's research was to determine whether combination of the termiticides lead to enhanced toxicity against termites. The study concluded instead that lower mortality was observed when imidacloprid was mixed with fipronil than with fipronil alone and higher mortality was observed with the combination than with imidacloprid alone. It was proposed that the presence of imidacloprid reduced the chances of termites coming in contact with and taking up the more toxic fipronil, leading to lower mortalities when the two termiticides were combined—a result more commonly expected if a repellant termiticide were mixed with a non-repellant agent. Based on the study results, the hypothesis that a synergistic effect existed between fipronil and imidacloprid was rejected. Currently, a mixture comprising a combination of these two termiticides is not available in the marketplace.

Therefore, given the observed high efficacies and toxicities of phenylpyrazoles and neonicotinoids when used separately to treat and prevent termite infestations, it would be desirable to provide a termiticide composition that effectively combines both a phenylpyrazole and a neonicotinoid without reducing the effectiveness of either termiticide.

SUMMARY

It has been unexpectedly found that a termiticide composition comprising active termiticides, wherein the active termiticides comprise a phenylpyrazole selected from the group consisting of acetoprole, ethiprole, fipronil, pyraclofos, pyrafluprole, pyriprole, vaniliprole, and combinations thereof, and, a neonicotinoid selected from the group consisting of imidacloprid, acetamiprid, nithiazine, thiamethoxam, dinotefuran, nitenpyram, thiacloprid, clothianadin, and combinations thereof, when used dispersed with an aqueous medium to form a termiticide concentrate, provides improved efficacy against subterranean termites. This is contrary to what has previously been determined.

The present termiticide compositions are preferably dispersed in an aqueous medium (e.g., water and/or a water-soluble or water-miscible organic solvent) thereby forming a termiticide concentrate. It has been found that the application of the novel termiticide concentrate comprising a combination of a phenylpyrazole and a neonicotinoid) to an area infested by termites results in unexpectedly improved control of the termites as compared to the results observed from application of a termiticide concentrate containing either termiticide by itself.

The present subject matter generally relates to a termiticide composition containing active termiticides comprising from about 1% to about 69% by weight of a phenylpyrazole selected from the group consisting of acetoprole, ethiprole, fipronil, pyraclofos, pyrafluprole, pyriprole, vaniliprole, and combinations thereof; and, from about 1% to about 69% by weight of a neonicotinoid selected from the group consisting of imidacloprid, acetamiprid, nithiazine, thiamethoxam, dinotefuran, nitenpyram, thiacloprid, clothianadin, and combinations thereof, wherein the composition comprises up to 70% by weight of total active termiticide.

Further, the present subject matter is directed to a termiticide concentrate comprising (1) a termiticide composition that includes active termiticides comprising from about 1% to about 69% by weight of a phenylpyrazole selected from the group consisting of acetoprole, ethiprole, fipronil, pyraclofos, pyrafluprole, pyriprole, vaniliprole, and combinations thereof; and, from about 1% to about 69% by weight of a neonicotinoid selected from the group consisting of imidacloprid, acetamiprid, nithiazine, thiamethoxam, dinotefuran, nitenpyram, thiacloprid, clothianadin, and combinations thereof, wherein the composition comprises up to 70% by weight of total active termiticide; and (2) an aqueous medium, such that the termiticide composition is dispersed in the aqueous medium to form the termiticide concentrate comprising from about 0.01% to about 2% by weight of the active termiticides.

In addition, the present subject matter further provides a method of controlling termites, the method comprising applying a termiticide concentrate to a locus or area where termite control is required, the termiticide concentrate comprising (1) a termiticide composition that includes active termiticides comprising from about 1% to about 69% by weight of a phenylpyrazole selected from the group consisting of acetoprole, ethiprole, fipronil, pyraclofos, pyrafluprole, pyriprole, vaniliprole, and combinations thereof: and, from about 1% to about 69% by weight of a neonicotinoid selected from the group consisting of imidacloprid, acetamiprid, nithiazine, thiamethoxam, dinotefuran, nitenpyram, thiacloprid, clothianadin, and combinations thereof, wherein the composition comprises up to 70% by weight of total active termiticide; and (2) an aqueous medium; wherein the termiticide composition is dispersed in the aqueous medium to form the termiticide concentrate with about 0.01% to about 2% by weight of the active termiticides.

DETAILED DESCRIPTION

The termiticide compositions and concentrates provided herein utilize a combination of active termiticides to treat termite infestations and prevent future infestations in indoor and outdoor areas such as about the perimeter of a building structure, as well as open areas, such as crop farms. The present compositions and concentrates are based in part on the finding that application of the novel termiticide concentrate to an area where termite control is desired results in improved control of termites and prevents further infestation.

Generally, the termiticide concentrate comprises (1) a termiticide composition that includes active termiticides comprising from about 1% to about 69% by weight of a phenylpyrazole selected from the group consisting of acetoprole, ethiprole, fipronil, pyraclofos, pyrafluprole, pyriprole, vaniliprole, and combinations thereof; and, from about 1% to about 69% by weight of a neonicotinoid selected from the group consisting of imidacloprid, acetamiprid, nithiazine, thiamethoxam, dinotefuran, nitenpyram, thiacloprid, clothianadin, and combinations thereof, wherein the composition comprises up to 70% by weight of total active termiticide; and (2) an aqueous medium; wherein the termiticide composition is dispersed in the aqueous medium to form the termiticide concentrate comprising from about 0.01% to about 2% by weight of the active termiticides. All percents provided herein are percent by weight based on the total weight of the composition unless otherwise indicated.

The termiticide composition comprises a combination of active termiticides, wherein the active termiticides comprise a phenylpyrazole and a neonicotinoid, and may optionally include other active termiticides known in the art. Alternatively, the active termiticides may consist only of a phenylpyrazole and a neonicotinoid.

In one embodiment, the phenylpyrazole is preferably selected from the group consisting of acetoprole, ethiprole, fipronil, pyraclofos, pyrafluprole, pyriprole, vaniliprole, and combinations thereof. Phenylpyrazoles may achieve their efficacy by disrupting the central nervous system by blocking the passage of chloride ions through the GABA receptor and glutamate-gated chloride channels (GluCl), components of the central nervous system. This disruption causes hyperexcitation of contaminated nerves and muscles, which results in eventual death. The compound is a slow-acting termiticide and, as such, can be carried back to nests. The amount of phenylpyrazole in the termiticide composition may be equal to from about 1% to about 69% by weight. Preferably, the composition comprises from about 1% to about 20% by weight of a phenylpyrazole. Even more preferably, the composition comprises from about 3% to about 10% by weight of a phenylpyrazole. In a preferred embodiment, the composition comprises about 6.6% by weight of a phenylpyrazole.

In a preferred embodiment, the phenylpyrazole is fipronil. Fipronil is also known as 5-amino-1-[2,6-dichloro-4-(trifluoromethyl)phenyl]-4-[(1-R,S)(trifluoromethyl)sulfinyl]-1H-pyrazole-3-carbonitrile, 5-amino-1-(2,6-dichloro-α,α,α-trifluoro-p-tolyl)-4-[(trifluoromethyl)sulfinyl]pyrazole-3-carbonitrile, and fluocyanobenpyrazole. Fipronil is also sold as a termiticide under the commercial name Termidor® (BASF). Fipronil is generally available as either a liquid or solid crystalline substance or powder. The chemical structure for fipronil is shown below.

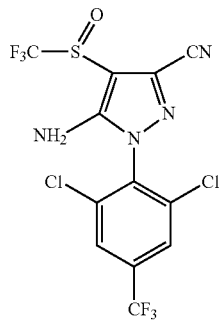 [SMILES: N#Cc1nn(-c2c(Cl)cc(C(F)(F)F)cc2Cl)c(N)c1S(=O)C(F)(F)F]

It is understood that active analogs and associated derivatives of fipronil, or any of the phenylpyrazoles discussed herein, (including enantiomers, diastereomers, racemates, or pharmaceutically acceptable salts thereof) are also within the scope of the present subject matter.

In one embodiment, the neonicotinoid is preferably selected from the group consisting of imidacloprid, acetamiprid, nithiazine, thiamethoxam, dinotefuran, nitenpyram, thiacloprid, clothianadin, and combinations thereof. Neonicotinoids achieve their efficacy by binding to the postsynaptic nicotinic acetylcholine receptors (nAChR). The amount of neonicotinoid present in the combination may be equal to from about 1% to about 69% by weight. Preferably, the amount of neonicotinoid in the termiticide composition is equal to from about 10% to about 40% by weight. Even more preferably, the amount of neonicotinoid in the termiticide composition is equal to from about 15% to about 30% by weight. In a preferred embodiment, the amount of neonicotinoid in the termiticide composition is equal to about 21.4% by weight.

In a preferred embodiment, the neonicotinoid is imidacloprid. Imidacloprid is also known as N-[1-[(6-Chloro-3-pyridyl)methyl]-4,5-dihydroimidazol-2-yl]nitramide and is sold as a termiticide commercially under the name Premise® (Bayer).

The chemical structure for imidacloprid is shown below.

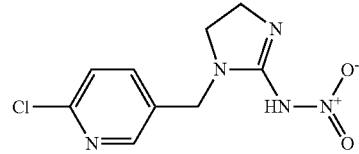 [SMILES: O=[N+]([O-])NC1=NCCN1Cc1ccc(Cl)nc1]

It is understood that analogs and associated derivatives of imidacloprid, or any of the neonicotinoids discussed herein, (including enantiomers, diastereomers, racemates, or pharmaceutically acceptable salts thereof) are also within the scope of the present subject matter.

A basic termiticide composition used to form the termiticide concentrates of the present subject matter comprises from about 1% to about 69% by weight of a phenylpyrazole and from about 1% to about 69% by weight of a neonicotinoid, wherein the composition comprises up to 70% by weight of total active termiticide (e.g., phenylpyrazole plus neonicotinoid). By way of non-limiting example, in one embodiment, the composition may comprise about 1% by weight of a phenylpyrazole and about 69% by weight of a neonicotinoid. In another embodiment, the composition may comprise about 69% by weight of a phenylpyrazole and about 1% by weight of a neonicotinoid. In yet another embodiment, the composition may comprises about 30% by weight of a phenylpyrazole and about 40% by weight of a neonicotinoid. In a further embodiment, the composition may contain about 10% by weight of a phenylpyrazole and about 60% by weight of a neonicotinoid.

In an alternative embodiment, the amount of total active termiticide present in the composition may be less than 70%. By way of non-limiting example, in one embodiment, the termiticide composition may include from about 1% to about 20% by weight of a phenylpyrazole and from about 10% to about 40% by weight of a neonicotinoid. In another embodiment, the termiticide composition may include from about 3% to about 10% by weight of a phenylpyrazole and from about 15% to about 30% by weight of a neonicotinoid. In an exemplary embodiment, the termiticide composition may include about 6.6% by weight of a phenylpyrazole and about 21.4% by weight of a neonicotinoid.

Alternatively, the composition may optionally comprise one or more active termiticides in addition to phenylpyrazole and neonicotinoid, at an amount such that the total of all active termiticides present in the composition does not exceed 70%.

The termiticide composition used to form the termiticide concentrates herein may also include, in addition to the active termiticides discussed above, one or more non-termiticide components or agents, such as surfactants, preservatives, solvents, antifoaming agents, thickeners, and the like.

The termiticide composition may include one or more surfactants, which may be of the emulsifying or wetting type, and may be selected from anionic, nonionic, amphoteric and zwitterionic surfactants and mixtures thereof. When the composition is to be combined with water, the use of at least one surfactant is generally required because the active termiticides are not water-soluble. In one embodiment, any surfactant known in the industry can be utilized. Examples of suitable anionic surfactants useful herein include, but are not limited to, alkyl sulfates, alkyl ether sulfates, alkaryl sulfonates, alkyl sulfosuccinates, n alkyl sarcosinates, alkyl phosphates, alkyl ether phosphates, alkyl ether carboxylates, alpha-olefin sulfonates, especially their ammonium, potassium, sodium, magnesium and mono-, di-, and triethanolamine salts, and mixtures thereof. Especially preferred anionic surfactants are dioctyl sodium sulphosuccinate (sold commercially as Aerosol® OT-B by Cytec) and ethoxylated tristyrylphenol phosphate potassium salt (sold commercially as Soprophor FLK by Rhodia).

Examples of suitable amphoteric surfactants useful herein include, but are not limited to, those selected from the group consisting of sultaines (such as cocamidopropyl hydroxy sultaine); glycinates (such as cocoamphocarboxyglycinates); glycines (such as cocoamidopropyldimethylglycine); propionates (such as sodium lauriminodipropionate, sodium cocamphopropionate, disodium cocoamphodipropionate, and cocoamphocarboxypropionate); and mixtures thereof. In addition, pseudo-amphoteric (ampholytic) surfactants such as betaines are also commonly grouped within the designation "Amphoteric" surfactants and can be used for similar purposes. Non-limiting examples of useful betaines include cocamidopropyl, coco and oleamidopropyl, and mixtures thereof.

Examples of nonionic surfactants useful herein include, but are not limited to, condensation products of aliphatic ($C_8$-$C_{18}$) primary or secondary linear branched chain alcohols with alkylene oxides or phenols with alkylene oxides, usually ethylene oxide and generally having from 6 to 30 ethylene oxide groups. Other nonionic surfactants suitable for use herein can include fatty acid alkanolamides. Representative fatty acid alkanolamides include those having $C_{10}$-$C_{18}$ carbons, for example, fatty acid diethanolamides such as isostearic acid diethanolamide and coconut fatty acid diethanolamide. Suitable fatty acid monoethanolamides, which may be used, include coconut fatty acid monoethanolamide and coco mono-isopropanolamide. Mixtures of any of the foregoing are further contemplated herein.

Semi-polar surfactants such as amine oxides are also suitable for use in the present termiticide compositions. These may include, but are not limited to, N-alkyl amine oxide, N-stearyl dimethylamine oxide, and mixtures thereof. A suitable N-acyl amide oxide includes N-cocamidopropyl dimethylamine oxide. The hydrophobic portion of the amine oxide surfactant may be provided by a fatty hydrocarbon chain having from about 10-21 carbon atoms.

The present termiticide composition may include a thickener. A thickener is desired in order to keep the termiticides suspended within the composition. Examples of the thickener include, but are not limited to, water-soluble polymers such as water-soluble saccharide and water-soluble synthetic polymer and inorganic powder such as silica, magnesium silicate, aluminum silicate, magnesium aluminum silicate, bentonite, smectite, hectorite and aluminum oxide. In one embodiment, a mixture of two or more kinds of the above-mentioned thickener is used. Examples of the water-soluble saccharide include xanthan gum, gum arabic, rhamsan gum, locust bean gum, carrageenan, welan gum, ligninsulfonic acid, starch, and carboxymethylcellulose and its salt. These water-soluble saccharides are commercially available, namely Kelzan® S (produced by CP Kelco) and Kelzan® ASX (produced by CP Kelco) for xanthan gum, and Cellogen® HE-90F (produced by Dai-ichi Kogyo Seiyaku) and Cellogen® HE-600F (produced by Dai-ichi Kogyo Seiyaku) for sodium carboxymethylcellulose.

The termiticide composition herein may include an antifreezing agent selected from the group of alcohols, diols, polyols, and combinations thereof. Suitable examples of antifreezing agents that can be used include but are not limited to glycerol, methanol, ethylene glycol, propylene glycol, potassium acetate, calcium magnesium acetate, sorbitol, and urea. An especially preferred antifreezing agent is propylene glycol.

The termiticide composition herein may include an antifoam agent (such as Antifoam SE23 from Wacker Silicones Corp. or SAG 30 from Univar Corp.).

The termiticide composition of the present disclosure may also include one or more preservative compounds. The preservative compounds act to prevent corrosion of the container which holds the termiticide composition. Suitable preservatives include sodium benzoate, benzoic acid, benzisothiazolinone (such as Proxel® GXL, produced by Arch Chemicals, Inc.) and potassium bicarbonate.

In one embodiment, the active termiticides are combined with one or more solvents (which may be, for example, water and/or an organic solvent) prior to forming the termiticide concentrate for application to a locus or area. One of skill in the art will appreciate that the concentration of active termiticides in the termiticide composition will need to be adjusted as necessary to account for the form in which the composition is being formulated and to ensure the termiticide composition comprises the appropriate concentration of active termiticides as provided herein.

The termiticide composition as provided above is preferably dispensed in an aqueous medium (preferably water and/or a water-soluble or water-miscible organic solvent) prior to its application to a locus or area where termite control is required, thereby forming a termiticide concentrate. In this respect, a termiticide concentrate is generally comprised of (1) a termiticide composition comprising from about 1% to about 69% by weight of a phenylpyrazole and from about 1% to about 69% by weight of a neonicotinoid, wherein the composition comprises up to 70% by weight of total active termiticide, and (2) an aqueous medium. All termiticide compositions that are or can be dispensed in an aqueous medium prior to application are, therefore, within the scope of the present subject matter (e.g. micro-emulsions, suspension concentrates, emulsifiable concentrates, wettable powders, water dispersible granules, capsule suspensions, emulsifiable granules, and combinations thereof). Preferably, the active termiticides are diluted in the termiticide concentrate to a concentration of from about 0.01% to about 2% by weight of the termiticide concentrate. In a preferred embodiment, the active termiticides am present in the termiticide concentrate at a concentration of from about 0.05% to about 0.5% by weight of the termiticide concentrate. One of skill in the art will appreciate that the weight of active termiticides added to the final product will need to be adjusted to account for the dilution and to ensure the final product comprises the appropriate final concentration of active termiticides.

The present termiticide concentrate can be prepared by dispersing the termiticide composition comprising the active termiticides in an aqueous medium to produce a termiticide concentrate suitable for application to a locus where termite control is required. It should be understood that the present concentrates encompass a variety of physical forms; however the concentrates are generally directed to liquid solutions and suspensions. The concentrates may be prepared by standard techniques known in the art. For instance, in one embodiment where the desired form is an emulsifiable concentrate, the emulsifiable concentrate is prepared by first using a filling hose to fill a tank between about one-quarter and about one-third full with an aqueous medium (e.g., water), wherein the tank comprises a motor and pump to agitate the contents. While the aqueous medium is being agitated, a termiticide composition comprising from about 1% to about 69% by weight of a phenylpyrazole and from about 1% to about 69% by weight of a neonicotinoid is prepared, wherein the composition comprises up to 70% by weight of total active termiticide. An appropriate amount of the termiticide composition is then added to the tank. Generally, an amount of from about 0.5 pounds to about 5 pounds of termiticide composition is added per gallon of aqueous medium. Preferably, about 1.5 pounds to about 4 pounds of termiticide composition is added per gallon of aqueous medium. In an exemplary embodiment, about 2.6 pounds of termiticide composition is added per gallon of aqueous medium. The tank is then filled with a remaining amount of aqueous medium (e.g., water) in order to prepare the desired volume of emulsifiable concentrate. Agitating continues until the termiticide composition is fully dispersed within the aqueous medium, thereby forming an emulsifiable concentrate including from about 0.01% to about 2% of the active termiticides.

In another embodiment, a foam termiticide can be prepared by preparing the termiticide concentrate as provided herein and additionally adding an appropriate amount of a foaming agent.

In a further embodiment, a crop spray can be prepared by combining the termiticide composition disclosed herein with an aqueous medium, such as water or petroleum distillates and mixing well until the composition is fully dispersed in the aqueous medium. The crop spray is then used with crop spraying equipment as is known in the art, such as irrigation systems (for example, sprinkler, furrow, drip (trickle), or border irrigation systems), row crop sprayers, trailed crop sprayers, low volume mist blowers, hydraulic sprayers, compressed air sprayers, and the like.

Using methods known to those of skill in the art, the termiticide concentrates are applied to a locus requiring termite control to treat and/or prevent termite infestation. The locus may comprise a perimeter or a portion of a perimeter about a structure. Alternatively, the locus may comprise an area substantially defined by a footprint of the structure. The locus may be smaller than the footprint of the structure and/or within the footprint. Alternatively, the locus to be treated may comprise any one or mom of a portion of a perimeter of the structure, the footprint of the structure, and an area associated with the structure but outside the perimeter of the structure. The locus may be a spot treatment inside or about a structure which is susceptible to infestation or is infested. The locus may comprise ground where the structure will be built in the future (typically called a preconstruction treatment) or the locus may comprise an existing structure (typically called a post-construction treatment).

In addition, the present pesticide concentrates may be applied to an open area (e.g., crop farm) containing crop products using methods known to those of skill in the art to control pests on crops. The crop products can be selected from any commonly known or used cash crops including fruits, vegetables, berries, nuts, leaves, seeds, grains and the like. Specific examples include crops, strawberries, raspberries, blueberries, melons, stone fruit, nut crops, potatoes, vegetables, turf grasses, seed crops (i.e., seed grasses, alfalfa seed), corn, rice, wheat, soybeans, dry beans, peanuts, cotton, sorghum, and other row crops, curcurbits, other small fruit crops, and horticultural plants.

Generally, the present termiticide concentrates can be applied at a rate of from about 1 gallon to about 10 gallons of termiticide concentrate per 10 linear feet per foot of depth. Preferably, the termiticide concentrates of the present invention are applied at a rate of from about 2 gallons to about 6 gallons of termiticide concentrate per 10 linear feet per foot of depth. Most preferably, the termiticide concentrates are applied at a rate of about 4 gallons of termiticide concentrate per 10 linear feet per foot of depth.

As is known and understood in the art, the objective of applying a termiticide to soil is to provide a continuous treated zone between the wood in the structure and termite colonies in the soil. Application procedures will depend on the soil type, grading, water table, presence of drainage tile, and the location of any wells in the area. The design of the structure, location of the termite colony, severity of infestation, and the termites' behavior must also be considered. Three common methods of applying termiticides to soils as known and disclosed in the art are broadcast spraying, subslab injection, and trenching/rodding. A low-pressure broadcast spray may be used to apply the termiticide concentrate as a preconstruction treatment before slabs are poured or as a preconstruction treatment of inaccessible crawl spaces. Generally, when spraying during preconstruction, the termiticide concentrate is applied at the rate of from about 1 to about 1.5 gallons per 10 square feet.

Subslab injection involves drilling holes in blocks, walls, slabs, or other portions of the infested building and injecting an effective amount of a termiticide concentrate through the holes to exterminate any termites present in the location. After the holes have been filled with the termiticide concentrate, the holes are plugged.

Trenching and rodding involves digging a narrow trench and then rodding into the soil at the bottom of the trench. The trench is also flooded, and the excavated soil is treated with the termiticide concentrate of the present invention. The treated soil is then replaced into the trench. The trench is typically dug immediately adjacent to the face of the foundation wall. Rodding the soil is accomplished by applying the termiticide concentrate through hollow tubes inserted into the soil about the bottom of the trench. The termiticide concentrate is applied as the rod is moved slowly downward, allowing the termiticide concentrate to spread.

While compositions and methods of embodiments of the present disclosure are generally described with reference to perimeter application of the composition, it should be understood that the compositions may alternatively or in addition be applied to any exterior target surface such as landscaping materials, open ground space away from the structures, crop products including row crops, areas around fence posts or other wood structures, and the like. For instance, a crop sprayer may be used to apply the concentrate of the present invention to crop products. Generally, when spraying crops, the concentrate is applied at the rate of up to about 20 gallons per acre.

It is also understood that the present compositions may be applied to the interior of building structures, including for example in void spaces, cracks, crevices, crawl spaces, hard-to-reach areas, basements, and the like.

The termiticide compositions and termiticide concentrates disclosed herein and the methods for controlling posts of the present disclosure are effective against a wide variety of pest populations generally. In several embodiments the pest is an arthropod and, in another embodiment, is an insect. The target pest may be selected from the group consisting of fleas, ants, cockroaches, beetles, earwigs, silverfish, crickets, spiders, centipedes, flies, midges, mosquitoes, gnats, moths, caterpillar, weevils, maggots, bedbugs, spiders, chigger, cicadas, grasshoppers, root borers, stalk borers, vine borers, fruit borers, leafhoppers, fruitworms, mites, wasps, hornets, yellow jackets, bees, centipedes, millipedes, scorpions, pillbugs, sowbugs and the like. In a preferred embodiment, the pest is a subterranean termite, including termites from the species of *Reticulitermes, Zootermopsis, Heterotermes*, and *Coptotermes*.

Definitions

As used herein, the terms "about" and "approximately" designate that a value is within a statistically meaningful range. Such a range can be typically within 20%, more typically still within 10%, and even more typically within 5% of a given value or range. The allowable variation encompassed by the terms "about" and "approximately" depends on the particular system under study and can be readily appreciated by one of ordinary skill in the art.

As used herein, the term "w/w" designates the phrase "by weight" and is used to describe the concentration of a particular substance in a mixture or solution.

As used herein, the term "treatment" or "treating" of a condition, such as termite infestation, includes inhibiting an existing condition or arresting its development; or ameliorating or causing regression of the condition. The term "preventing" or "prevention" of a condition, such as termite infestation, includes substantially blocking or inhibiting the development or growth of a condition before it starts. Compositions that treat or prevent infestations herein will preferably exhibit at least 90% efficacy.

As used herein, the term "termiticide" or "termiticidal" refers to a type of insecticide composition or mixture comprising one or more pesticidal agents at a concentration capable of preventing, reducing or eliminating termite infestations. Pesticidal agents in this regard can include phenylpyrazoles (such as fipronil) and neonicotinoids (such as imidacloprid).

Unless otherwise defined, all technical and scientific terms used herein have the same meaning as is commonly understood by one of skill in the art to which this invention belongs at the time of filing. If specifically defined, then the definition provided herein takes precedent over any dictionary or extrinsic definition. Further, unless otherwise required by context, singular terms shall include pluralities, and plural terms shall include the singular. Herein, the use of "or" means "and/or" unless stated otherwise. All patents and publications referred to herein are incorporated by reference.

The following examples are intended to further illustrate and explain the present subject matter. The present subject matter, therefore, should not be limited to any of the details in these examples.

Example 1—Method of Making a Termiticide Composition Comprising Fipronil and Imidacloprid A termiticide composition was prepared according to typical industry processing techniques using the active termiticides fipronil and imidacloprid as described hereinabove. Table 1 is the list of ingredients used to prepare a termiticide composition comprising 6.6% w/w fipronil and 21.4% w/w imidacloprid.

TABLE 1

Termiticide Composition

| Ingredient | Amount | Concentration (w/w) |
| --- | --- | --- |
| Fipronil tech. (As 100%) | 66 lbs | 6.6% |
| Imidacloprid (As 100%) | 214 lbs | 21.4% |
| Soprophor FLK | 30 lbs | 3.0% |
| Aerosol OT-B | 10 lbs | 1.0% |
| Proxel GXL | 1 lb | 0.1% |
| Propylene glycol | 80 lbs | 8.0% |
| SAG-30 | 2 lbs | 0.2% |
| Kelzan S | 2 lbs | 0.2% |
| Water | 595 lbs | 59.5% |
| TOTAL | 1000 lbs | 100% |

Three separate tanks were used to prepare the termiticide composition. The first tank (Tank 1) incorporated a twin propeller blade stirrer having one blade close to the bottom of the tank and the second blade about half way up the propeller shaft to ensure good mixing throughout the batch. The second tank (Tank 2) was a small tank incorporating a propeller blade stirrer. The third tank (Tank 3) incorporated a twin propeller blade stirrer in a similar arrangement to that of Tank 1. A media mill (such as a Dyno-mill) using 2 mm glass beads as the grinding media was also used.

The termiticide composition was prepared by first adding the following ingredients to Tank 1 in the order provided: 595 lbs of water, 10 lbs of Aerosol OT-B, 30 lbs of Soprophor FLK, and 2 lbs of SAG-30. Constant agitation was maintained during the addition of each ingredient. The contents of Tank 1 were mixed with moderate agitation for a minimum of 15 minutes until homogenous. 214 lbs of imidacloprid (powder) was gradually added to rank 1 with constant stirring, being careful to minimize entrapment of air during the addition. Next, 66 lbs of fipronil (powder) was gradually added to Tank 1 with constant stirring, being careful to minimize entrapment of air during the addition. After the actives were added, the contents of Tank 1 were mixed with moderate agitation for a minimum of 30 minutes until homogenous. The entire contents of Tank 1 were then passed through the media mill into Tank 3.

80 lbs of Propylene glycol followed by 2 lbs of Kelzan S were added to Tank 2 under constant agitation. Mixing continued until all the ingredients were homogenous. The contents of Tank 2 were pumped into Tank 3 and the combined contents were agitated moderately for 45 minutes until the batch was thickened. The product was examined for homogeneity and color, with the desired product being an off-white suspension with no lumps.

Example 2—Method of Making a Termiticide Concentrate Comprising Fipronil and Imidacloprid A termiticide concentrate can be prepared using the termiticide composition set forth in Example 1.

Fill a tank equipped with a filling hose and pump between about one-quarter and one-third full of water. Start the pump to begin by-pass agitation. Add an appropriate amount of termiticide composition to the tank in order to prepare the desired dilution as set forth in Table 2. Add the remaining water. Continue to run the pump allowing recirculation through the hose back into the tank until the termiticide composition is completely dispersed.

TABLE 2

Mixing Table

| Emulsion Concentrate | Gallons Water | Amount of Termiticide Composition |
| --- | --- | --- |
| 0.067% | 100 | 27.5 fl. oz |
|  | 50 | 13.8 fl. oz. |
|  | 25 | 6.9 fl. oz. |
|  | 1 | 0.3 fl. oz. |
| 0.13% | 100 | 55 fl. oz. |
|  | 50 | 27.5 fl. oz. |
|  | 25 | 13.8 fl. oz. |
|  | 1 | 0.6 fl. oz. |
| 0.067% | 10 | 80 ml |
|  | 5 | 40 ml |
|  | 2 | 16 ml |
|  | 1 | 8 ml |
| 0.13% | 10 | 160 ml |
|  | 5 | 80 ml |
|  | 2 | 32 ml |
|  | 1 | 16 ml |

Example 3—Residual Efficacy Evaluations of Imidacloprid and Fipronil in Combination and Separately Applied to Sand/Filter Paper Substrates Against Western Subterranean Termites, *Reticulitermes* Hesperus The test substances set forth in Table 3 were obtained from LABServices:

TABLE 3

Test Substances

| Insecticide | Brand | EPA Reg. No. | Net Weight | Lot No. |
| --- | --- | --- | --- | --- |
| 21.4% Imidacloprid | Dominion® 2L | 53883-229 | 27.5 oz | 23236 |
| 21.4% Imidacloprid/ 6.6% Fipronil | Imi-Fip SC | N/A | 27.5 oz | ECS-29-133 |
| 9.1% Fipronil | Termidor® SC | 7969-210 |  | 71010011F1 |

Label rates for each test substance were used. Uniform rates for each test substance were set at a dilution of 0.07% active ingredient at an equivalent of 4 gallons per 10 linear feet per foot of depth, equal to 4.8 mL of diluted material per replicate: (1) 0.01% a.i. Dominion® 2 L (0.65 mL Dominion® in 200 mL of water); (2) 0.07% a.i. Imi-Fip SC (0.50 mL Imi-Fip SC in 200 mL of water); (3) 0.07% a.i. Termidor® SC (1.54 mL Termidor® SC in 200 mL of water); (4) untreated water control. Test insects were obtained from and identified by Dr. Vernard Lewis (University of California, Berkeley).

Petri dishes were labeled with study number, treatment group, treatment date, species, and replicate number. Five replicates per treatment group were made. 62 grams (45 mL equivalent) of washed and screened play sand was weighed out into a 12 ounce plastic squat cup using a Sartorius Basic 600 g balance. The sand was treated with 4.8 mL of the appropriate treatment and mixed thoroughly in the cup using a metal spatula. Once the mixture was homogenized, the sand/treatment was transferred to the appropriate Petri dish and compressed using the bottom of a clean 12 ounce plastic squat cup. A 7.5 cm filter paper disc was placed on top of the treated sand and approximately 30 mixed population subterranean termites (workers and soldiers) were placed onto the paper. The lids were placed on top of the Petri dishes and the replicates were stacked according to treatment. No further moisture was added to the Petri dishes through the remainder of the evaluations.

Bioassays were conducted in the facility under ambient conditions of temperature, relative humidity and light. Termites were assessed for mortality at approximately the same time each day for test days 1, 2, 3, 4, 5, 6, and 7. Due to the difficulty of assessing mortality in subterranean arthropods without disrupting the bioassay system, approximate numbers of living termites were recorded. Consideration of tunneling behavior and apparent repellency were noted at each data point.

Both Termidor® SC and Imi-Fip SC were very efficacious against subterranean termites. Termidor® Sc demonstrated 100% mortality at one day after treatment, while Imi-Fip SC demonstrated 98.0% mortality at the same evaluation point. As shown in Table 4, efficacy in the Imi-Fip SC test group reached 100% mortality by test day 2. While mortality was almost identical in both the Termidor® SC and Imi-Fip SC test groups, there were differences in tunneling and feeding behavior. Termidor® SC had no repellent activity, with termites showing no aversion to the treated sand media and long tunnels going throughout the entire substrate. Termites died equally in the tunnels as well as the surface. Imi-Fip SC did show toxicity and behavioral activity, with almost all termites dying on the surface of the sand substrate and very few short tunnels present.

Dominion® 2 L had very little mortality observed through the first four days of the evaluation period, with 18.0% mortality by test day 4 (Table 4). Dominion® 2 L affected termites to an extent that they avoided contact with the treated substrate demonstrating an aggregation behavior on top of the filter paper. These termites did not show normal negative phototropism or consume any of the filter paper, but subsequent mortality data demonstrated only a 67.3% reduction by test day 7. A high degree of aggregation behavior to the treated bioassay system was observed in all Dominion® 2 L treated replicates. A lack of tunneling was observed and the majority of termites remained on the untreated filter paper placed on top of the treated sand media. Termites that came in contact with the treated sand appeared intoxicated, but not dead and did not feed on the filter paper. Behavior for Dominion® 2 L treated termites was lethargic and uncoordinated when compared to the untreated control group.

TABLE 4

Average percent mortality of western subterranean termites, Reticulitermes hesperus, with constant exposure to sand media that has been treated with selected termiticide formulations in the laboratory (n = 5)

| Treatment | Day 1 | Day 2 | Day3 | Day 4 | Day 5 | Day 6 | Day 7 |
|---|---|---|---|---|---|---|---|
| Dominiont ® 2L (0.07% Imidacloprid) | 8.0 | 10.7 | 17.3 | 18.0 | 42.7 | 40.7 | 67.3 |
| Termidor ® SC (0.0 7% Fipronil) | 100 | 100 | 100 | 100 | 100 | 100 | 100 |
| Imi-Fip (0.07% Imidacloprid + Fipronil) | 98.0 | 100 | 100 | 100 | 100 | 100 | 100 |
| $H_2O$ α | 1.3 | 5.3 | 5.3 | 1.3 | 7.3 | 4.7 | 4.7 |

Both formulations containing fipronil (Termidor® SC and Imi-Fip SC) demonstrated quick mortality in subterranean termites, with 100% and 98.0% mortality by test day 1, respectively. Termidor® SC did not alter termite tunneling behavior.

Both formulations containing imidacloprid (Dominion® 2 L and Imi-Fip SC) demonstrated a lack of tunneling activity and feeding while termites exposed to Imi-Fip SC also had an aversion to the treated substrate by aggregating on the top surface of the untreated filter paper.

Imi-Fip SC demonstrated an additive effect with the combination of imidacloprid and fipronil with respect to lack of termite tunneling, feeding, and a high degree of mortality when compared to the compounds separately.

Example 4—Effects of Imidacloprid-Fipronil on Eastern Subterranean Termites (*Reticulitermes flavipes*) and Formosan Subterranean Termites (*Coptotermes formosanus*) in Thin Plate Bioassays A laboratory study was conducted, using recently collected *R. flavipes* and *C. formosanus*. Thin plate bioassays were assembled using 0.6 cm glass and 0.6 cm clear Lexan. A sheet of 20.3×66 cm glass was used for the bottom. Two pieces of 2.5×61 cm glass were laid along the long edges, and two pieces of 2.5×61 cm glass were laid across the ends. Each arena had 450 g of screened sand evenly applied, and moistened with deionized water to help hold it in place during construction of the arenas. Fisher brand tongue depressors, cut in half, were used as a food source for the termites, and placed at one end of the arena. Prior to adding the Lexan top sheets, 0.6 cm holes were drilled at one end, and three 0.6 cm treatment apertures were drilled equally spaced apart at the center line. One 8 cm Petri dish with a 0.6 cm hole drilled in the bottom was lined up with the hole at the end of the top sheet, and glued down. Glue was allowed to dry for 72 hours. Large binder clips were used to hold the arena together.

Termiticide solutions were prepared as follows: Fipronil 0.017%; Fipronil 0.03%; Imidacloprid 0.05%; Imi-Fip 0.067% (Imidacloprid 0.05%, Fipronil 0.017%); and Untreated Control (water only). Ten ml of each finished solution of termiticide were applied to each arena: each of the three treatment apertures received 3.3 ml of termiticide. The treatments were allowed to dry for 24 hours, and the treatment apertures were covered with a 2.5×7.5 cm microscope slide. In each Petri dish, 500 worker and 15 soldier termites were added, using either *R. flavipes* or *C. formosanus*. Each treatment was replicated four times. Data regarding distance tunneled and mortality were collected daily for eight days. Data was analyzed using Analysis of Variance (ANOVA) and means were separated by Tukey's HSD (Honest Significant Difference test (IBM SPSS v 19).

Results. There were significant differences (P=0.05) in mortality caused by the treatments at different time periods for both species of termites. See Tables 5, 6. For *R. flavipes*, by day 3 all of the termiticide treatments caused at least 67% mortality, with 100% mortality by day 7. For *C. formosanus*, by day 3, all treatments caused at least 15% mortality with 100% mortality achieved by day 8. Tunneling by both species was adversely affected by the treatments.

TABLE 5

Mean % mortality through time of *Reticulitermes flavipes* in thin plate bioassays with selected termiticides

| Treatment | Days Post-treatment | | | | | | | |
|---|---|---|---|---|---|---|---|---|
| | 1 | 2 | 3 | 4 | 5 | 6 | 7 | 8 |
| Fipronil 0.017% | 5.25 a | 30.50 a | 75.00 a | 77.50 a | 90.00 b | 95.50 b | 100.00 a | 100.00 a |
| Fipronil 0.03% | 0.75 b | 2.25 b | 67.50a | 70.00 a | 90.00 b | 100.00 a | 100.00 a | 100.00 a |
| Imidacloprid 0.05% | 6.35 a | 12.00 b | 75.00 a | 80.00 a | 80.00 c | 100.00 a | 100.00 a | 100.00 a |
| Imi-Fip$_a$ 0.067% | 7.25 a | 21.50ab | 71.75 a | 71.75 a | 99.00 a | 100.00 a | 100.00 a | 100.00 a |
| Untreated Controls | 0.00b | 0.00 c | 5.25 b | 5.25 b | 7.75 d | 8.25 b | 8.25 b | 8.25 b |

Means followed by the same letter are not significantly different (p = 0.05) per Tukey's HSD $_a$Imi-Fip 0.067% = Imidacloprid 0.05%, Fipronil 0.017%

TABLE 6

Mean % mortality through time of *Coptotermes formosanus* in thin plate bioassays with selected termiticides

| Treatment | Days Post-treatment | | | | | | | |
|---|---|---|---|---|---|---|---|---|
| | 1 | 2 | 3 | 4 | 5 | 6 | 7 | 8 |
| Fipronil 0.017% | 1.37 a | 8.62 b | 15.00 a | 30.60 a | 72.20 a | 72.20 c | 83.50 b | 100.00a |
| Fipronil 0.03% | 5.05 a | 17.25ab | 19.75 a | 49.40 a | 70.50 a | 99.25 a | 100.00 a | 100.00a |
| Imidacloprid 0.05% | 0.80 a | 5.30 b | 23.25 a | 30.00 a | 55.00 a | 88.75 b | 100.00 a | 100.00a |
| Imi-Fip$_a$ 0.067% | 0.25 a | 20.00 a | 20.00 a | 25.00 a | 40.00 b | 52.50 c | 100.00a | 100.00a |
| Untreated Controls | 1.00 a | 6.25 b | 6.25 b | 10.50 b | 10.50 c | 10.50 d | 10.50 c | 10.50 b |

Means followed by the same letter are not significantly different (p = 0.05) per Tukey's HSD
$_a$Imi-Fip 0.067% = Imidacloprid 0.05%, Fipronil 0.017%

Example 5—Transfer Effects of Imi-Fip (Imidacloprid-Fipronil) Termiticide Among Formosan *Coptotermes formosanus* and Eastern Subterranean *Reticulitermes flavipes* Termites The purpose of this study was to determine whether there is transference of Imi-Pip among nestmates of subterranean termites. Arenas for this study consisted of a 15 cm Petri dish. The following treatments were used: Imi-Fip 50 ppm (imidacloprid 37 ppm and fipronil 13 ppm); Imidacloprid 50 ppm; Fipronil 50 ppm; Untreated Control Marked (water only), and Untreated Control unmarked (water only The three termiticide treatments were mixed using formulated product: Imi-Fip was mixed to concur with the manufacturer's low rate of 0.067% (imidacloprid 500 ppm and fipronil 170 ppm). The trial included four replications of each of the following: donors (treated with 50 ppm of one of the three termiticide formulations) to recipients at ratios of 1:19; 5:15; 10:10; 15:5; and the controls. Donor and untreated marked control termites were marked using RustOleum® Marking Paint, using methodology described by Keefer et al. 2012. Two untreated soldier termites for each species were added to each arena to simulate colony dynamics. Post-treatment observations for mortality were made at 4 h and then daily through day 7.

Results. For *R. flavipes*, at the four hour mark, the imidacloprid treatment had a mean total mortality of 27%; Imi-Fip had a mean total mortality of 20%; and Fipronil and the marked, untreated controls had mortality of 3.75%. Imi-Fip had total mortality of 100% after three days; the individual treatments had 100% mortality at day 7. For *C. formosanus*, the four hour mark presented total mortality of 34% for Imi-Fip; 9% for imidacloprid; and 1% for fipronil. At day 7, Tmi-Fip had 100% mortality, while imidacloprid and fipronil had 97% and 90%, respectively. There were no significant differences between the mortality rates of the termiticide treatments at day 6 or 7 for either species. The results also show evidence of transference of the termiticides from donors to recipients, based on the mortality rates observed. See Tables 7-14.

TABLE 7

Mean % mortality of *Reticulitermes flavipes* donors and recipients through time by treatment

| Treatment | 4 h | 1 d | 2 d | 3 d | 4 d | 5 d | 6 d | 7 d |
|---|---|---|---|---|---|---|---|---|
| Imidacloprid 50 ppm | 27.18 a | 64.37 a | 64.37 b | 73.43 b | 73.43 b | 90.93 a | 98.43 a | 100.00a |
| Fipronil 50 ppm | 3.75 b | 23.51 b | 57.18 b | 70.31 b | 72.81 b | 83.75 a | 98.12 a | 100.00a |
| Imi-Fip$_a$ 50 ppm | 20.00 a | 89.68 a | 95.31 a | 100.00a | 100.00a | 100.00a | 100.00a | 100.00a |
| Marked Untreated | 3.75 b | 10.00 b | 17.50 c | 17.50 c | 17.50 c | 17.50 c | 17.50 b | 17.50 b |
| Unmarked Untreated | 0.00 c | 0.00 c | 3.75 d | 3.75 d | 3.75 d | 3.75 c | 8.75 b | 10.00 b |

$_a$Imi-Fip = Imidracloprid-Fipronil
Means followed by the same letter in the same column are not significantly different (p = 0.05) per Tukey's HSD

TABLE 8

Mean total % mortality of *Reticulitermes flavipes* donors (treated with 50 ppm imidacloprid) and recipients through time by ratio of donor to recipient

| Ratio | 4 h | 1 d | 2 d | 3 d | 4 d | 5 d | 6 d | 7 d |
|---|---|---|---|---|---|---|---|---|
| 1:19 | 10.00 c | 30.00 b | 30.00 b | 33.75 b | 72.50 b | 76.25 b | 98.75 a | 100.00 a |
| 5:15 | 21.25 bc | 51.25 b | 51.25 b | 60.00 b | 71.25 b | 87.50 ab | 95.00 a | 100.00 a |
| 10:10 | 43.75 a | 80.00 a | 80.00 a | 100.00 a | 100.00 a | 100.00 a | 100.00 a | 100.00 a |
| 15:05 | 33.75 ab | 96.25 a | 96.25 a | 100.00 a | 100.00 a | 100.00 a | 100.00 a | 100.00 a |
| MU$_a$ | 3.75 d | 10.00 c | 17.50 c | 17.50 c | 17.50 c | 17.50 c | 17.50 b | 17.50 b |
| UU$_b$ | 0.00 e | 0.00 d | 3.75 d | 3.75 d | 3.75 d | 3.75 d | 8.75 b | 10.00 b |

$_a$MU = Marked Untreated Controls
$_b$UU = Unmarked Untreated Controls
Means followed by the same letter in the same column are not significantly different (p = 0.05) per Tukey's HSD

TABLE 9

Mean total % mortality of *Reticulitermes flavipes* donors (treated with 50 ppm fipronil) and recipients through time by ratio of donor to recipient

| Ratio | 4 h | 1 d | 2 d | 3 d | 4 d | 5 d | 6 d | 7 d |
|---|---|---|---|---|---|---|---|---|
| 1:19 | 3.75 a | 10.00 b | 16.25 c | 22.50 c | 26.25 c | 52.50 b | 97.50 a | 100.00 a |
| 5:15 | 5.00 a | 17.50 b | 53.75 b | 70.00 b | 72.50 b | 82.50 a | 95.00 a | 100.00 a |
| 10:10 | 1.25 a | 17.50 b | 71.25 ab | 88.75 ab | 92.50 ab | 100.00 a | 100.00 a | 100.00 a |
| 15:5 | 5.00 a | 56.25 a | 87.50 a | 100.00 a | 100.00 a | 100.00 a | 100.00 a | 100.00 a |
| MU$_a$ | 3.75 a | 10.00 b | 17.50 c | 17.50 c | 17.50 c | 17.50 c | 17.50 b | 17.50 b |
| UU$_b$ | 0.00 b | 0.00 c | 3.75 d | 3.75 d | 3.75 d | 3.75 d | 8.75 b | 10.00 b |

$_a$MU = Marked Untreated Controls
$_b$UU = Unmarked Untreated Controls
Means followed by the same letter in the same column are not significantly different (p = 0.05) per Tukey's HSD

TABLE 10

Mean total % mortality of *Reticulitermes flavipes* donors (treated with 50 ppm Imi-Fip) and recipients through time by ratio of donor to recipient

| Ratio | 4 h | 1 d | 2 d | 3 d | 4 d | 5 d | 6 d | 7 d |
|---|---|---|---|---|---|---|---|---|
| 1:19 | 3.75 c | 71.25 b | 81.25 a | 100.00 a | 100.00 a | 100.00 a | 100.00 a | 100.00 a |
| 5:15 | 23.75 ab | 91.25 ab | 100.00 a | 100.00 a | 100.00 a | 100.00 a | 100.00 a | 100.00 a |
| 10:10 | 30.00 a | 96.25 a | 100.00 a | 100.00 a | 100.00 a | 1.00.00 a | 100.00 a | 100.00 a |
| 15:5 | 22.50 ab | 100.00 a | 100.00 a | 100.00 a | 100.00 a | 100.00 a | 100.00 a | 100.00 a |
| MU$_a$ | 3.75 c | 10.00 c | 17.50 b | 17.50 b | 17.50 b | 17.50 b | 17.50 b | 17.50 b |
| UU$_b$ | 0.00 d | 0.00 d | 3.75 c | 3.75 c | 3.75 c | 3.75 c | 8.75 b | 10.00 b |

$_a$Imi-Fip = Imidracloprid-Fipronil
$_b$MU = Marked Untreated Controls
$_c$UU = Unmarked Untreated Controls
Means followed by the same letter in the same column are not significantly different (p = 0.05) per Tukey's HSD

TABLE 11

Mean % mortality of *Coptotermes formosanus* donors and recipients through time by treatment

| Treatment | 4 h | 1 d | 2 d | 3 d | 4 d | 5 d | 6 d | 7 d |
|---|---|---|---|---|---|---|---|---|
| Imidacloprid 50 ppm | 9.68 b | 32.50 ab | 52.50 ab | 67.18 ab | 76.25 a | 87.50 a | 96.25 a | 97.81 a |
| Fipronil 50 ppm | 9.37 b | 50.62 ab | 53.12 ab | 59.68 ab | 67.81 a | 82.50 a | 85.50 a | 90.00 a |
| Imi-Fip$_a$ 50 ppm | 34.06 a | 71.25 a | 83.12 a | 90.31 a | 97.50 a | 97.50 a | 98.12 a | 100.00 a |
| Marked Untreated | 0.00 b | 0.00 c | 5.00 c | 11.25 c | 12.50 b | 12.50 b | 16.25 b | 16.25 b |
| Unmarked Untreated | 0.00 b | 0.00 c | 0.00 d | 1.25 d | 2.50 c | 2.50 c | 6.25 c | 6.25 c |

$_a$Imi-Fip = Imidracloprid-Fipronil
Means followed by the same letter in the same column are not significantly different (p = 0.05) per Tukey's HSD

TABLE 12

Mean total % mortality of *Coptotermes formosanus* donors (treated with 50 ppm imidacloprid) and recipients through time by ratio of donor to recipient

| Ratio | 4 h | 1 d | 2 d | 3 d | 4 d | 5 d | 6 d | 7 d |
|---|---|---|---|---|---|---|---|---|
| 1:19 | 0.00 b | 1.25 c | 5.00 c | 33.75 b | 72.50 b | 82.50 b | 93.75 a | 95.00 a |
| 5:15 | 3.75 b | 12.50 b | 22.50 b | 37.50 b | 55.00 c | 67.50 b | 91.25 a | 96.25 a |
| 10:10 | 17.50 a | 85.00 a | 96.25 a | 100.00 a | 100.00 a | 100.00 a | 100.00 a | 100.00 a |
| 15:5 | 17.50 a | 31.25 b | 86.25 a | 100.00 a | 100.00 a | 100.00 a | 100.00 a | 100.00 a |
| MU$_a$ | 0.00 b | 0.00 d | 5.00 c | 11.25 c | 12.50 d | 12.50 c | 16.25 b | 16.25 b |
| UU$_b$ | 0.00 b | 0.00 d | 0.00 d | 1.25 d | 2.50 e | 2.50 d | 6.25 c | 6.25 c |

$_a$MU = Marked Untreated Controls
$_b$UU = Unmarked Untreated Controls
Means followed by the same letter in the same column are not significantly different (p = 0.05) per Tukey's HSD

TABLE 13

Mean total % mortality of *Coptotermes formosanus* donors (treated with 50 ppm fipronil) and recipients through time by ratio of donor to recipient

| Ratio | 4 h | 1 d | 2 d | 3 d | 4 d | 5 d | 6 d | 7 d |
|---|---|---|---|---|---|---|---|---|
| 1:19 | 0.00 b | 0.00 b | 8.75 bc | 18.75 b | 25.00 b | 30.00 b | 30.00 b | 60.00 b |
| 5:15 | 3.75 b | 2.50 a | 3.75 b | 20.00 b | 46.25 b | 100.00 a | 100.00 a | 100.00 a |
| 10:10 | 17.50 a | 100.00 a | 100.00 a | 100.00 a | 100.00 a | 100.00 a | 100.00 a | 100.00 a |
| 15:5 | 16.25 a | 100.00 a | 100.00 a | 100.00 a | 100.00 a | 100.00 a | 100.00 a | 100.00 a |
| $MU_a$ | 0.00 b | 0.00 b | 5.00 c | 11.25 b | 12.50 c | 12.50 c | 16.25 b | 16.25 c |
| $UU_b$ | 0.00 b | 0.00 b | 0.00 d | 1.25 c | 2.50 d | 2.50 d | 6.25 c | 6.25 d |

$_a$MU = Marked Untreated Controls
$_b$UU = Unmarked Untreated Controls
Means followed by the same letter in the same column are not significantly different (p = 0.05) per Tukey's HSD

TABLE 14

Mean total % mortality of *Coptotermes formosanus* donors (treated with 50 ppm Imi-Fip) and recipients through time by ratio of donor to recipient

| Ratio | 4 h | 1 d | 2 d | 3 d | 4 d | 5 d | 6 d | 7 d |
|---|---|---|---|---|---|---|---|---|
| 1:19 | 2.50 b | 30.00 b | 50.00 b | 61.25 a | 90.00 a | 90.00 a | 92.50 a | 100.00 a |
| 5:15 | 37.50 ab | 55.00 b | 82.50 ab | 100.00 a | 100.00 a | 100.00 a | 100.00 a | 100.00 a |
| 10:10 | 33.75 ab | 100.00 a | 100.00 a | 100.00 a | 100.00 a | 100.00 a | 100.00 a | 100.00 a |
| 15:5 | 62.50 a | 100.00 a | 100.00 a | 100.00 a | 100.00 a | 100.00 a | 100.00 a | 100.00 a |
| $MU_a$ | 0.00 c | 0.00 c | 5.00 c | 11.25 b | 12.50 b | 12.50 b | 16.25 b | 16.25 b |
| $UU_b$ | 0.00 c | 0.00 c | 0.00 d | 1.25 c | 2.50 c | 2.50 c | 6.25 c | 6.25 c |

$_a$Imi Fip = Imidracloprid Fipronil
$_b$MU = Marked Untreated Controls
$_c$UU = Unmarked Untreated Controls
Means followed by the same letter in the same column are not significantly different (p = 0.05) per Tukey's HSD Although the subject matter described herein is susceptible to various modifications and alternative iterations, specific embodiments thereof have been described in greater detail above. It should be understood, however, that the detailed description of the termiticide composition is not intended to limit the present subject matter to the specific embodiments disclosed. Rather, it should be understood that the present subject matter is intended to cover all modifications, equivalents, and alternatives failing within the spirit and scope herein as defined by the claim language.

What is claimed is:

1. A method for increasing mortality effect of fipronil on a population of termites, cockroaches, or ants, comprising applying to a locus requiring termite, cockroach, or ant control, a termiticide concentrate, comprising (1) a termiticide composition having (a) 3% to 10% by weight of fipronil, and (b) 15% to 30% by weight of imidacloprid, and (2) an aqueous medium; wherein the termiticide composition is dispersed in the aqueous medium to form the termiticide concentrate comprising from 0.038%±20% to 0.38%±20% by weight of imidacloprid and from 0.012%±20% to 0.12%±20% by weight of fipronil; wherein the ratio of fipronil to imidacloprid in the termiticide composition is between 1:1.5 and 1:10;
wherein the population comprises donors and recipients; and
wherein the locus is a perimeter or a portion of a perimeter about a structure, an area substantially defined by a footprint of a structure, an area within the footprint of a structure, one or more portion of a perimeter of a structure, one or more portion of the footprint of the structure, one or more portion of an area associated with the structure but outside the perimeter of the structure, a spot inside the structure, the ground where a structure will be or is being built, or an open area containing crop products.

2. The method of claim 1, wherein the termiticide concentrate is applied in an amount of about 1 to 10 gallons per 10 linear feet per foot of depth of area treated.

3. The method of claim 1, wherein the termite is selected from the species *Reticulitermes, Zootermopsis, Heterotermes,* and *Coptotermes.*

4. The method of claim 1, wherein the termite is of species *Reticulitermes.*

5. The method of claim 1, wherein the weight ratio of fipronil to imidacloprid is 1:3.24.

6. The method of claim 1, wherein the termiticide concentrate is applied in an amount of about 2 to 6 gallons per 10 linear feet per foot of depth of area treated.

7. The method of claim 1, wherein the method is effective for increasing mortality effect of fipronil on a population of termites, cockroaches, or ants comprising applying the concentrate comprising fipronil and imidacloprid which is more effective than fipronil when applied alone.

8. The method of claim 1, wherein the donor to recipient ratio is between 1:19 and 3:1.

9. The method of claim 7, wherein the termiticide concentrate is applied in an amount of about 1 to 10 gallons per 10 linear feet per foot of depth of area treated.

10. The method of claim 7, wherein the termite is selected from the species *Reticulitermes, Zootermopsis, Heterotermes,* and *Coptotermes.*

11. The method of claim 7, wherein the termite is of species *Reticulitermes.*

12. The method of claim 7, wherein the weight ratio of fipronil to imidacloprid is 1:3.24.

13. The method of claim 1, wherein the termiticide composition comprises 6.6% by weight of fipronil, and 21.4% by weight of imidacloprid.

14. The method of claim 13, wherein the termiticide concentrate comprises 0.05% by weight of imidacloprid and 0.017% by weight of fipronil.

* * * * *